June 14, 1960
R. J. RIZZO
2,940,150
CLAMP OF THE RESILIENT-STRAP, FEED-SCREW TYPE
Filed Nov. 13, 1958
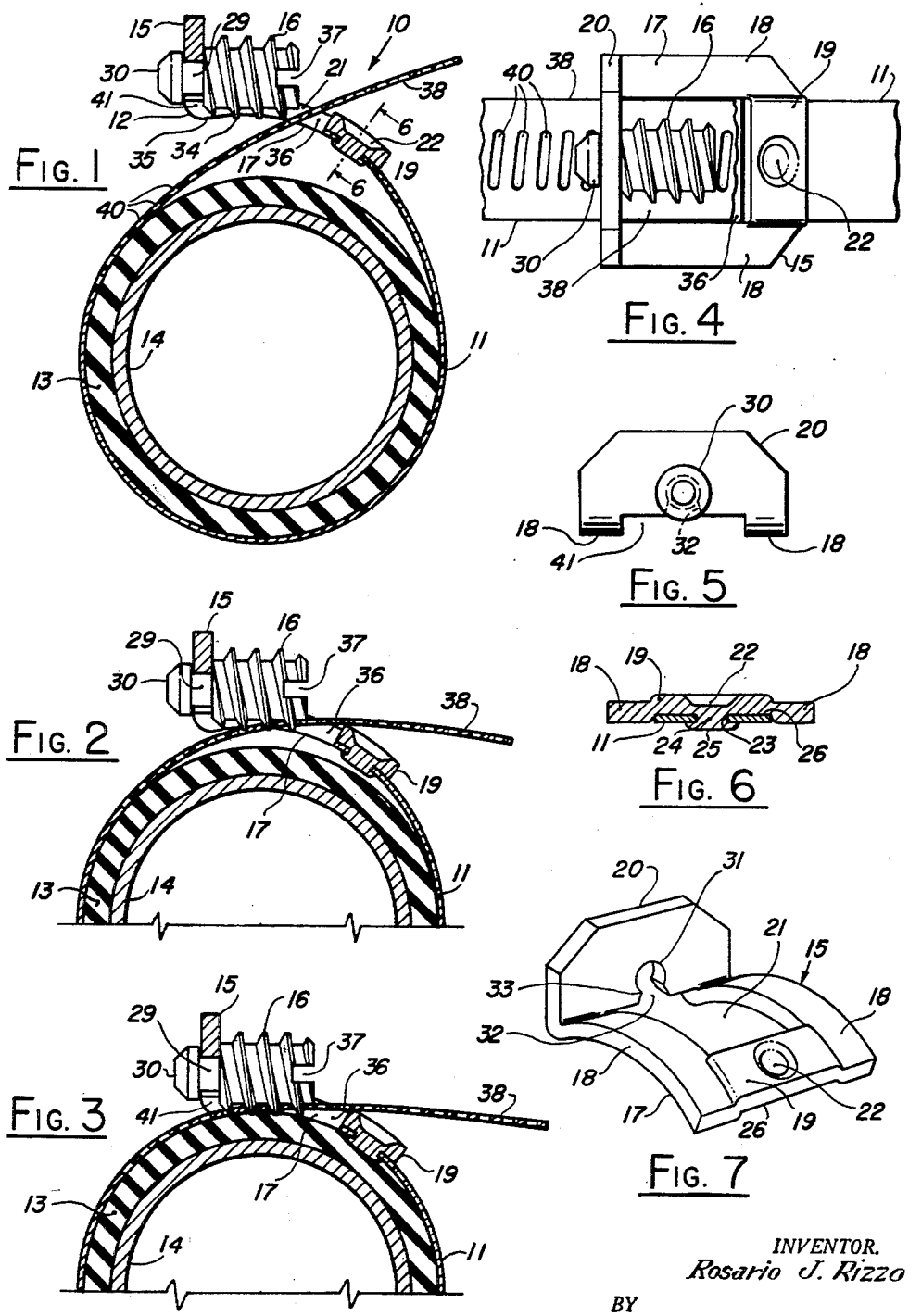
INVENTOR.
Rosario J. Rizzo
BY
J. Augustus Semma
ATTORNEY United States Patent Office 2,940,150
Patented June 14, 1960

2,940,150

CLAMP OF THE RESILIENT-STRAP, FEED-SCREW TYPE

Rosario J. Rizzo, 1790 Diane St., Elmont, N.Y.

Filed Nov. 13, 1958, Ser. No. 773,690

8 Claims. (Cl. 24—274)

The present invention relates to a clamp of the general type comprising a resilient band or strap and a fastening device mounted near one end of the strap and including a rotatable clamping feed screw adapted to mesh with feed conformations on the section of the strap near its other free end for drawing the strap tightly about a member to which the clamp is to be attached, as said screw is turned. Such a clamp, for example, may be used to clamp a flexible tubular member, such as a hose, to a rigid tubular member, such as a pipe, to establish a leak-proof connection between the hose and the pipe.

An object of the present invention is to provide a clamp of the general type described, which is comparatively simple and inexpensive to manufacture, which is positive and certain in operation, which can be easily applied and removed with rapid engaging and disengaging features, and which is free of loose or movable parts except for a screw rotatable solely about its longitudinal axis.

In accordance with certain features of the present invention, the fastening device at the end of the resilient strap is in the form of a simple rigid angular open frame having a base secured rigidly at one end to one end of the strap and adapted to seat circumferentially on the hose or other member to be clamped, and a bearing flange at the other end of the base upstanding from said base almost at right angles thereto. The base has an opening through which the free end section of the strap can be threaded in the operation of applying the clamp to a hose or the like. A clamping feed screw is journalled at its rear end in the bearing flange and is unsupported at its forward end, so that said screw is in the form of a cantilever, and this screw can be rotated about its longitudinal axis but is otherwise fixed against movement relative to the frame. The screw extends over and along the frame opening forwardly from the flange towards the end of the frame to which the end of the strap is rigidly secured. The free section of the strap at the other end has a series of conformations corresponding to the threads of the screw for feed mesh engagement therewith, and the screw extends over and along the frame opening for only a limited distance to render a substantial end section of the opening forwardly of the screw clear to form a passage through which the free end section of the strap may be threaded from the inner or underside of the frame to the upper or outer exiting side, in the application of the clamp to a hose or the like. The strap has sufficient resiliency, so that when the free end section of the strap is threaded through this clear passage and released, this free end section, due to its inherent resiliency, expands into quick engagement with the forward portion of the screw, thereby causing at least the forward convolution of the thread nearest its forward end on the side nearest the base of the frame to rapidly engage the nearest feed conformation in the strap with little or no hunting action, and to serve thereby as a quick acting catch for the free end section of the strap. The screw has means, as for example, a slot to receive a screw driver by which it can be turned about its longitudinal axis, and as this screw is turned, the free end section of the strap is drawn over the other end section of the strap in overlapping relationship thereto, and at the same time, the end sections of the strap come closer together and closer to the periphery of the hose. As the turning of the screw progresses, more of the screw convolutions move into mesh with the feed conformations on the free end section of the strap, thereby creating a more positive hold on said free end strap section, until the strap is tightened closely about the hose. In tightened position, the screw not only prevents the free end section of the strap from moving endwise, but bears as a cantilever radially inwardly on this strap section, thereby pressing said strap section close to the hose and at the same time pressing the frame in conjunction with the other end section of the strap rigidly secured thereto close to the hose. This cantilever pressing action of the screw assures a more positive stronger hold between the opposite end sections of the strap through the intermediacy of the fastening device described.

The fastening device described is simple to manufacture, since it has no movable parts except for a rotatable cantilever screw requiring only a simple end journal and no side trunnions, and requires no costly housing but a simple one piece frame which can be manufactured by a stamping operation. Moreover, the operation of slipping the free end section of the strap through the frame opening requires no release of any catches or other holding devices. Moreover, the clearance in the frame afforded for the threading of the free end section of the strap therethrough in the initial stages of applying the clamp to a hose is so large and so free from impediment or obstruction as to facilitate the manipulation required for this purpose.

Various other objects, features and advantages of the invention are apparent from the following description and from the accompanying drawings, in which:

Fig. 1 is a section of the clamp embodying the present invention, and shown in the initial stage of application to a hose to be clamped to a pipe;

Fig. 2 is a section of the clamp similar to that of Fig. 1, but shown in a later stage of application, after the screw has been turned and the strap has been partially drawn about the hose;

Fig. 3 is a section of the clamp similar to that of Fig. 1 but shown in the final fully tightened stage;

Fig. 4 is a top plan view of part of the clamp including the fastening device and shown with the free end section of the strap threaded therethrough;

Fig. 5 is the rear end view of the fastening device;

Fig. 6 is a section of the fastening device taken on lines 6—6 of Fig. 1; and

Fig. 7 is a perspective of the frame part of the fastening device.

Referring to the drawings, the clamp 10 of the present invention comprises a strap 11 made of strong thin resilient material, such as spring steel, and a fastening device 12 rigidly and permanently secured to one end of the strap and adapted to releasably hold on to the section of the strap at the other free end. This clamp 10 is shown employed to bind a hose 13 hermetically to a rigid pipe 14.

The fastening device 12 comprises a metal frame 15 and a clamping feed screw 16 journalled therein. The metal frame 15 is made of one piece, preferably by stamping, and is composed of a platelike foot or base 17 having side arms 18 and cross bar 19 at its forward end and having a bearing flange 20 at its rear end upstanding from the base approximately at right angles thereto, these base components being substantially rectangularly arranged to define a substantially rectangular opening 21. The base 17 is arcuately curved to conform approximately to the circumferential curvature of the hose 13 to be clamped, so as to seat substantially and conformably on said hose in fully tightened position of the clamp 10, and the opening 21 is slightly wider than the width of the strap 11 to receive said strap snugly at the sides therein, as shown in Fig. 4, when the clamp 10 is applied to the hose 13.

The cross bar 19 is rigidly and permanently secured to one end of the strap 11 by pinning. For that purpose, the center part 22 of the cross bar 19 is shown depressed and extruded through a hole 23 in the strap to form and thrust a pin projection 24 through said hole. This pin projection 24 is upset against the inner face of the strap 11 to form a securing head 25. The pinning construction described is preferred because it can be accomplished by a single stamping operation which depresses and upsets almost at the same time, but as far as certain aspects of the invention are concerned, the frame bar 19 can be secured to one end of the strap 11 by any other means, as for example, by the use of a separate rivet.

To permit the frame base 17 to seat more conformably on the hose in fully tightened position of the clamp 10 without interference from the strap 11, the base is formed at the end secured to the strap with a recess 26 wide enough to receive the end of the strap snugly therein, and deep enough to set the strap firmly therein against sidewise displacement and preferably deep enough to locate the inner face of the strap end flush with the underside of the base, as shown in Fig. 6. This recess 26 is desirably formed by pressing the cross bar 19 in the stamping operation of producing the frame 15.

The bearing flange 20 at the rear end of the frame 15 has journalled therein the rear end of the clamping screw 16 forming part of the fastening device 12. For that purpose, the screw 16 has at its rear end a journal 29 terminating at its outer end in a head 30, and the flange 20 is formed with a bearing hole 31 large enough to receive the journal with a snug bearing fit, and an entry notch 32 tapering towards and leading into said hole and defining a throat 33 where said notch connects into said hole, which is narrower than the diameter of the screw journal to retain the journal in the bearing hole 31 against release therefrom, but which is wide enough to permit said journal to be forced with a press-fit through said throat and into said bearing hole in the process of assembly. When assembled as shown, the screw 16 will be retained against movement relative to the frame 15 except rotative movement about its longitudinal axis. The screw 16, in inoperative position of the clamp 10, is supported only at its journal end as described, so that said screw constitutes a cantilever, and extends along the frame 15 and over the frame opening 21 centrally between the sides thereof and into said opening sufficiently, so that the lower side 34 thereof is substantially flush with the inner face 35 of the frame 15, as shown in Fig. 1. The frame opening 21 is sufficiently long in relation to the screw 16 to extend forwardly of the screw and to define between the forward end of the screw and the cross bar 19 a clear passage 36 constituting the forward portion of said frame opening and serving the important function to be described.

The screw 16 is provided with a thread, which is of the general buttress type but which for facility in manufacture by means of an automatic standard multi-spindle screw machine, is desirably a modified buttress thread in which the forward face instead of extending at right angles to the longitudinal axis of the screw as in the standard buttress thread, is inclined slightly rearwardly, as for example, an angle of 3° with a plane at right angles to said axis, and the rear face is inclined forwardly, as for example, at an angle of 30° with a plane at right angles to said axis.

The forward unsupported end of the screw 16 is provided with a diametrical slot 37 to receive a screw driver.

The free end section 38 of the strap 11 has a series of screw engaging conformations 40 spaced longitudinally therealong for sufficient distance, so that the strap may be employed to clamp hose varying in diameter within a predetermined range, and shown in the form of elongated slots for feed engagement with the screw 16. These slots 40 extend at an angle with the transverse line of the strap 11 corresponding to the helix angle of the screw thread near the root diameter and near its inner side (side closest to the frame base 17) and their spacings correspond to the pitch of the thread. The width of each slot 40 is such, as to permit the screw thread to turn freely therein, and to engage the forward edges of the slots 40 for feed and holding action.

In the operation of applying the clamp to a hose, the strap 11 is wrapped around the hose, and the free end section 38 of the strap is threaded through the clear passage 36, as shown in Fig. 1. Release of the strap 11 causes said strap under the action of its inherent resiliency to expand towards extended position, and this causes the free end section 38 of the strap to flex outwardly into engagement with the thread of the screw 16, and the convolution of the thread of the screw on its inner side near its forward end to extend into one of the slots 40 in said strap action, causing thereby said thread to act as a catch for said strap section.

In the applied position of the clamp 10 described with the free end section 38 of the strap latched to the screw 16, the screw is turned through a screw driver in the slot 37 clockwise (assuming that the screw is a right hand screw), causing thereby the free end section 38 of of the strap 11 to be drawn by screw feeding action through the clear passage 36 and the strap to close in on the hose, as shown in Fig. 2. During this clamp tightening operation, more of the thread convolutions progressively extend into and mesh with more of the feed slots 40 in the free end strap section 38, and the two end sections of the strap 11 move closer together radially and closer radially to the periphery of the frame base 17, while said free end strap section moves angularly towards the screw 16 and towards a position alongside of the inner side 34 of the screw 16, with corresponding increase in the positiveness of the holding connection between the screw 16 and said free end strap section. In the final clamping stage shown in Fig. 3, the base 17 of the frame 15 seats almost completely on the periphery of the hose, and the screw 16 extends substantially tangential to this periphery in close proximity thereto. In this position, the screw 16 serves as a cantilever, pressing down on the section of the strap 11 extending in the frame opening 21 between the periphery of the hose and the rear edge of the frame cross bar 19, as shown in Fig. 3, and serves to hold said strap section down close to the periphery of the hose. The bearing flange 20 has a recess 41 on its inner side between the side arms 18 wide enough and deep enough to nest the strap 11 snugly therein in fully tightened position of the clamp shown in Fig. 3.

To remove the clamp 10 from the hose, all that is necessary is to turn the screw 16 in the opposite direction to loosen the strap 11 sufficiently to cause its free end section 38 to be withdrawn through the clear passage 36 in the frame 15, in the reverse manner from that during which the clamp is applied.

It is seen that the fastening device is inexpensive to manufacture, requiring only two parts, namely the frame 15 and the screw 16, which can be made by mass production methods, and having no movable parts aside from a rotatable screw axially fixed in relation to the frame 15. Besides the simplicity and inexpensiveness of the fastening device, this device has the added virtue of being easily applied and manipulated for clamping or unclamping action, and because of its construction, assures positive clamping action.

It should be noted that the platelike base 15 extends in such a direction in relation to the strap 11, that in clamping position of the strap, the base follows generally the direction of the contour of said strap and the screw 16 follows a direction generally parallel to said contour and is close to said contour along the full length of said screw. This relative orientation of the parts of the clamp in clamping position has the favorable effects of (1) affording a compact assembly in which the parts do not project obtrusively beyond or laterally of the clamping contour of the strap and (2) limiting clamping stresses substantially in close substantially parallel directions along the strap, so that disruptive bending stresses are avoided.

While the invention has been described with particular reference to a specific embodiment, it is to be understood that it is not to be limited thereto, but it is to be construed broadly and restricted solely by the scope of the appended claims.

What is claimed is:

1. A clamp comprising a resilient strap, and a fastening device for the opposite ends of the strap, said fastening device comprising a frame having a platelike base with an opening, said base being rigidly secured at one end to one end of the strap and extending away from said strap end in the general direction of said strap when said strap is straight and in unclamped position, said base having a bearing at its other end fixed in relation to said base, and a screw journalled at one end in said bearing and extending close to and along said opening from said bearing towards said one end of the base, said screw being fixed against movement except rotative movement about its longitudinal axis and having means by which said screw may be manually turned in either direction about said axis, said opening extending beyond the other end of said screw towards said one end of the base to define between said screw and the end of the base secured to one end of the strap a clear passage for the free section of the strap at the other end of the strap, said free end section of the strap having a series of screw engageable conformations spaced therealong for screw feed drawing action of said free end strap section through said passage upon the turning of the screw in one direction, said base in clamping position of said strap extending in the general direction of the contour followed by said strap, and said screw in clamping position of the strap extending in a general direction substantially parallel and close to said contour.

2. A clamp as described in claim 1, wherein said frame base is arcuately curved to conform substantially to the curvature of the member, such as a hose, to be clamped, and has spaced side arms and a cross bar at said one end of the base arranged substantially rectangularly to define said opening, said cross bar being rigidly secured to said one end of the strap, and said bearing at said other end of the base being in the form of a flange integral with said base and upstanding therefrom.

3. A clamp as described in claim 2, wherein said screw has a journal at said one end of the screw, and said flange has a bearing hole for said journal large enough to receive said journal with a snug rotative fit, and has an entry notch leading from one side of the flange to said hole and a restricted throat part dimensioned in relation to the diameter of the journal to require and permit said journal to be press-fitted through said restricted part before it can reach said hole.

4. A clamp as described in claim 3, wherein said screw at the outer end of the journal is formed with a head to prevent axial movement of the screw in one direction in relation to the flange.

5. A clamp as described in claim 1, wherein the means by which said screw may be manually turned comprises a diametrical slot at said other end of said screw to receive a screw driver therein.

6. A clamp as described in claim 1, wherein said screw is supported only at its journal end.

7. A clamp as described in claim 1, wherein said frame is of one piece in the form of an angle consisting of said base and a flange at said other end of the base upstanding from said base and constituting said bearing.

8. A clamp comprising a resilient strap, and a fastenning device for the opposite ends of the strap, said fastening device comprising a frame in one piece having a platelike base arcuately curved to conform substantially to the curvature of the member, such as a hose, to be clamped, and having spaced side arms and a cross bar at one end of the base arranged substantially rectangularly to define an opening wide enough to permit an end section of the strap to pass therethrough with a substantially snug side fit, said cross bar being rigidly secured to one end of said strap, a bearing flange at the other end of said base upstanding from said base in a direction substantially at right angles to the general plane of said base, and a screw journalled at one end in said flange along an axis substantially parallel to said general plane and supported only at the latter end, said screw extending along said opening from said flange towards the cross bar and being fixed against movement except rotative movement about its longitudinal axis and having means at one end by which said screw may be manually turned in either direction about said axis, said opening extending beyond the other end of said screw towards said cross bar to define between said other end of the screw and said cross bar a clear passage for the free section of the strap at the other end of the strap, said free end section of the strap having a series of screw engageable conformations spaced therealong for screw feed drawing action of said free end strap section through said passage upon the turning of the screw in one direction.

References Cited in the file of this patent

UNITED STATES PATENTS

| | | |
|---|---|---|
| 2,689,998 | O'Shei | Sept. 28, 1954 |

FOREIGN PATENTS

| | | |
|---|---|---|
| 217,111 | Switzerland | Jan. 16, 1942 |
| 432,954 | France | Oct. 16, 1911 |